Jan. 7, 1958 M. G. COPLEN 2,818,681
CONTAINER FOR PLANTS
Filed Oct. 27, 1953 2 Sheets-Sheet 1

INVENTOR
MILO G. COPLEN,
BY Stone, Boyden & Mack
ATTORNEYS

Jan. 7, 1958  M. G. COPLEN  2,818,681
CONTAINER FOR PLANTS
Filed Oct. 27, 1953  2 Sheets-Sheet 2

INVENTOR
MILO G. COPLEN,
ATTORNEYS

United States Patent Office 2,818,681
Patented Jan. 7, 1958

2,818,681

CONTAINER FOR PLANTS

Milo G. Coplen, Rockville, Md.

Application October 27, 1953, Serial No. 388,471

6 Claims. (Cl. 47—34)

This invention relates to containers for plant root balls and to the combination, as an article of sale, of a container, a plant root ball in said container, and means cooperating with the root ball and certain structural details of the container whereby the plant is secured against accidental loss of the root ball and plant from the container.

In the marketing of small plants, shrubs and trees, it is of importance that the potted plant be securely held within the container serving as the pot regardless of the material of the container. It is also of importance that the pot be of material which will not soften or decompose due to the water used to keep the plant and its root ball moist. The device of the present invention serves to satisfy such needs.

One of the features of the container of the present invention relates to the particular details of the bottom construction wherein a removable bottom plate is held by one portion of the container which is recurved upwardly at its base portion and is provided with a narrow centrally projecting flange on which the bottom floor plate rests. The floor plate has additional characteristics provided by certain drainage grooves and marginal vents for the release of water for the passage of air.

Additional features of the container relate to a recurved upper marginal rim portion and to the use of downwardly projecting tabs which extend from the uppermost edge of the container downwardly on the exterior, being spaced slightly from the upper side wall whereby a fastening cord may be inserted beneath each tab and strung across the top of the earth ball and possibly also around the stem or trunk of a plant whereby the earth ball and plant are firmly bound and held within the container.

Yet another detail of the invention relates to the specific position of the downwardly projecting fastening tabs, mentioned above, to an outwardly extending peripheral bead whereby the lower end of the tabs are spaced slightly away from the side wall of the container and are in a position for the ready reception of a fastening cord.

A modification of the fastening tabs is provided wherein the tabs are formed of wire loops which project downwardly, the main portion of the wire of such loops extending around the outer wall and the recurved downwardly extending upper marginal rim portion. In this form, the wire is substantially completely hidden except as to those portions constituting the fastening loops serving as tabs.

Another advantageous detail of the construction of this improved plant container is provided by the use of one or more of the tabs as an element to assist in hanging the container, as when it is desired to position a row of the containers with their plants so that the containers will be supported at one rim portion, thus slightly tilted to display the container and the plants in a tilted position.

The foregoing construction lends itself advantageously to the use of metal or plastic or any material which does not absorb water or become weakened by the use of water. Sheet metal forms a very satisfactory material from which to fashion the containers of the present invention. The plastic, preferably translucent or opaque, can be used to advantage. With such materials used for the containers and a careful selection of plants, a highly satisfactory product is thus available for marketing and such products can be displayed to advantage at roadside stands, filling stations and the like.

The above and additional features and advantages of the container and the article of sale comprising the container and root ball are described in greater detail and claimed in the following claims and will be understood from the accompanying drawings, in which:

Referring in detail to the several figures of the drawings, 1 is the side wall of a metal container in the general conventional shape of a tapered flower pot, the lower end of which is smaller than the upper end. 2 identifies the extreme lower edge of the side wall 1 and 3 indicates the extreme upper edge or top rim of the container. The upper edge of the container is bent over outwardly and downwardly to provide downwardly extending rim portions or flanges 3ᵃ extending from the uppermost edge 3. At intervals the downwardly extending portion 3ᵃ is cut so as to form downwardly extending narrow portions herein termed fastening tabs 4, the function of which will be described.

Figure 1:
Fig. 1 represents a side elevation of a container embodying the details of the present invention, showing a plant positioned within the container and secured by fastening cords.
Figure 3:
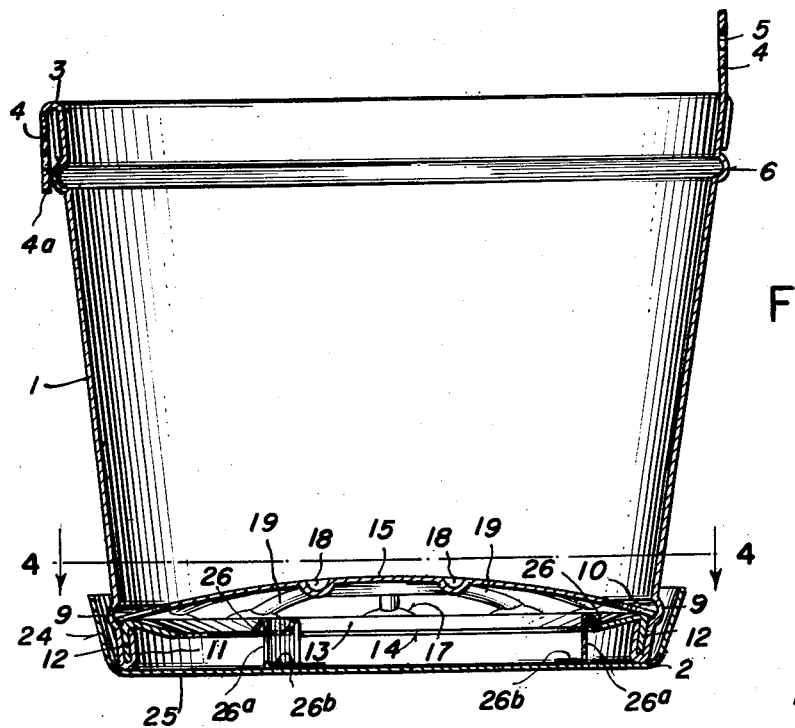
Fig. 3 is a vertical sectional view taken centrally through the container shown in Fig. 1, but with one of the fastening tabs extending upwardly to facilitate the hanging of the container.

The tabs 4 are separate from the portions 3ᵃ so as to permit the passage of a cord, string or wire beneath the tab 4 and between it and the adjacent flange portions 3ᵃ. Likewise also the tabs 4 are preferably longer than the flange portions 3ᵃ, thus as illustrated in Figure 1. One or more of the tabs 4 are provided with openings 5 therethrough, whereby the tab may be hung over a nail or hook when the tab is bent into an upright position as shown in Fig. 3.

An outwardly extending bead 6 is located in the upper portion of the side wall 1 and at a position wherein the tabs 4 extend slightly below the greatest width of the bead 6, thus as shown at 4ᵃ in Fig. 1.

Figure 2:
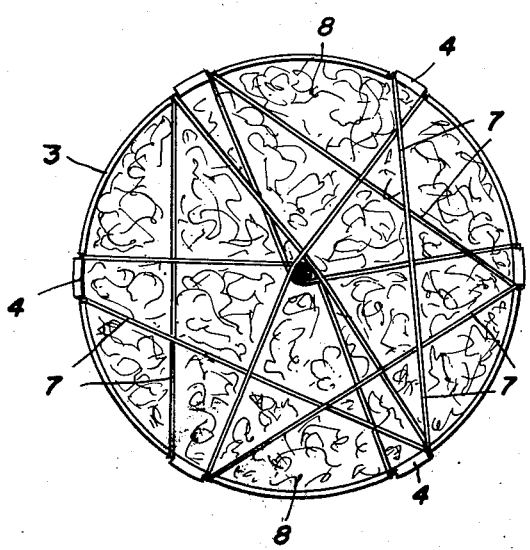
Fig. 2 is a view taken on the line 2—2 of Fig. 1, looking in the direction of the arrows.

Means for securing a plant root ball in the container 1 is provided by a cord 7 which is laced back and forth across the top of the root ball and from tab 4 to tab 4 on opposite sides of the container as shown in Figures 1 and 2. Some of the lacing may pass around or partly around the central stem or trunk of the plant or small tree so as to hold it more firmly with respect to the container side wall. At 8 in Figure 1, there is indicated the usual excelsior which is used on top of the earth ball per se to help retain the moisture.

In the foregoing, the description has pertained to the construction at the upper portion of the container. There will now be described the details relating to the removable bottom or base plate. At a point slightly above the lower edge 2 of the side wall 1, there is an outwardly projecting bead 9 which extends completely around the side wall 1. A corresponding groove 10 is formed on the interior of the container in the side wall thereof. As shown in Figure 3, the material of the side wall is continued inwardly and thence upwardly from the lower edge 2 to provide an upwardly extending wall 11 which terminates at a point slightly below the inner groove 10. In between the upwardly extending wall 11 and the corresponding portion of the outer wall 1, there is provided sufficient space for the reception of a downwardly extending flange 12 which forms a part of a flange member 12—13 and which portion 13 constitutes a centrally extending flange which rests on the upper end edge of the wall 11. The flange 13 has an upper surface which extends downwardly and centrally whereby to lead moisture from the contents of the container away from the side wall and lower edge 2 thereof. The flange 13 is relatively narrow as compared to the entire width of the container and the innermost edge thereof indicated at 14 constitutes the margin of a central opening through which moisture may escape from the container. The upper surface of the central extending flange 13 serves the additional function of supporting the under surface of the extreme lateral edge of a bottom or base plate for the container as will now be described.

The bottom or base of the container includes a plate 15 which is shown as having an arcuate or dome-shaped upper surface with its highest point located centrally and its edges located at the lowermost portion, thus whereby moisture from within the container may move laterally to escape. By reference to Figure 4, it will be observed that the extreme outer edge of the plate 15 is indicated at 16. This edge 16 rests within the groove 10, and as indicated in the foregoing, rests upon the upper edge or highest point of the flange 13. The surface of the plate 15 has certain specific features which contribute to the strength of the plate and serve also to promote the elimination of excess moisture. The plate 15 is provided with a central groove 18 concentric with the walls of the container and located at a short distance from the axial center of the plate 15. Leading radially outwardly and downwardly to the notches 17 are a plurality of grooves 19 which serve to lead moisture toward the periphery of the plate. These grooves not only serve the useful function of conveying moisture away from the root ball but they also serve to increase the rigidity of the plate.

At the outer periphery 16 of the plate there are a series of cut away portions or notches 17 which admit air and also will serve to release water from the container to the upper surface of the flange 13 and from which latter it may flow away. The flange 13 acts as a bearing surface when pots are set on soil, preventing settling into soil and consequent obstruction of drainage. The notches 17 in the plate 15 allow roots to grow through the bottom of the can to the soil below but when lifted the roots outside can be saved by merely pushing the bottom plate 15 upwards until the plant is out of the container, at which time the plate can be easily removed without cutting the roots.

Figure 5:
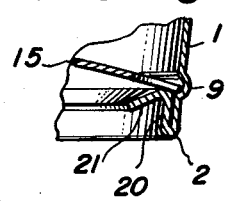
Fig. 5 is an enlarged fragmentary view of a modification of the lower portion of the side wall and its inturned central extending flange.

A modification of the construction at the lower end of the container is shown in Figure 5. Whereas in Figure 3 the flange member 12—13 is shown as an element which is formed independently of the container side wall 1 and is assembled with the downwardly extending portion 12 between the side wall 1 and the inner wall 11, there is shown in Figure 5 a form of construction wherein the material of the wall 1 extends upwardly from the lower edge 2 with a recurved upwardly extending wall 20 which reaches to a point adjacent the bead 9 and groove 10 and thence extends centrally and downwardly to provide a flange 21 which latter in shape and contour is the substantial equivalent of the flange 13. Thus in Figure 5 a unitary construction is provided wherein the removable plate 15 rests on the upper edge of the flange 21.

Figure 6:
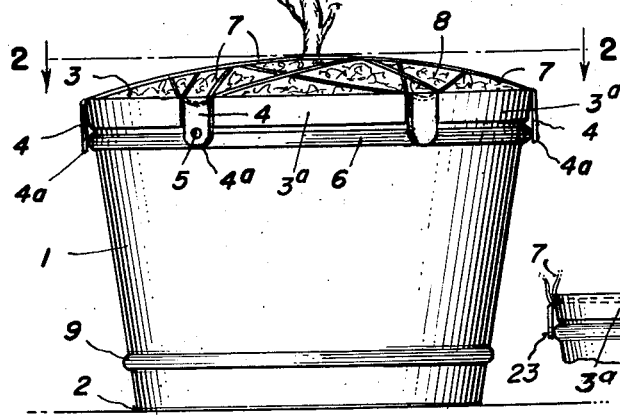
Fig. 6 shows a modification of the fastening tabs wherein the tabs are formed of loops in a wire which encircles the side wall of the container.

A modification for the construction of the tabs 4 is shown in Figure 6. In this view, the tabs 4 are eliminated. A wire element 22 is inserted between the upper portion of the side wall and the downwardly extending rim portions or flange 3ª so as to be located substantially at the upper portion of that space. In lieu of the tabs 4, the wire 22 is bent downwardly as shown at 23 in Figure 6 to provide a wire tab, the outer periphery of which is substantially the equivalent of the outer periphery of the tab 4. Thus the fastening cord or string 7 may be slipped or inserted beneath the lower end of the wire tabs 23 and serve to secure the plant root ball in the same manner as shown in Figures 1 and 2.

Figure 4:
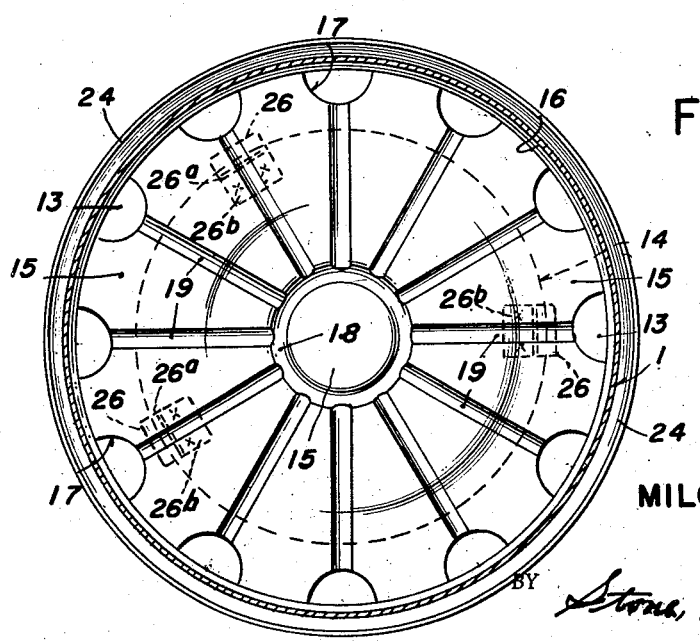
Fig. 4 is a sectional view taken on line 4—4 of the container shown in Fig. 3 looking in the direction of the arrows showing the full plan view instead of the half section shown in Fig. 3.

A tray or saucer for the foregoing described container for plants is provided for quick attachment to the container 1. As shown in Figures 3 and 4, the tray has upright side walls 24 and the bottom 25 which is preferably imperforate. This tray serves the usual function of a tray such as commonly associated with flower pots but differs in the following characteristics. The tray is adapted to be quickly secured to the flange 13 of the base portion container by means of specially shaped spring snap elements which will now be described. Preferably three of these snap elements are used and they are spaced at equal distances from each other on the inner or upper surface at the bottom of the tray. These securing snap elements include a downwardly extending catch 26 which is adapted to snap over the innermost edge of the flange 13 so as to engage the upper surface of the flange. Element 26 extends from the flange diagonally and centrally upwardly and thence it projects downwardly as indicated at 26ª to a point immediately adjacent to the upper surface of the floor 25 of the tray and from which point the fastening element extends laterally with the horizontal portion 26ᵇ. The portion 26ᵇ is firmly secured to the upper surface of the bottom 25 of the tray by such means as welding or soldering. The material of the fastening element is preferably of spring steel or other material having spring characteristics whereby when the tray is pushed upwardly the diagonal portion 26 of the fastening element will slide past the edge 14 of the flange 13 and snap over that edge so as to engage the upper surface of the flange. In brief, the three spring elements serve as latches or spring detents whereby the tray is firmly secured to the container 1 and is in a position to receive water passing downwardly from the container.

The material of this container and its tray may be substituted as desired, if the material is not water absorbent and is fairly rigid in the form illustrated in the accompanying drawings.

I claim:

1. A container for plants and their root balls comprising a side wall open at the top and bottom, said side wall having adjacent to but spaced upwardly from its lower edge an outwardly extending groove in its inner surface, the material of said side wall being continued from its lower edge and inwardly, thence upwardly, thence centrally as a flange sloping downwardly centrally and having a central opening therein, and a floor element resting on the uppermost part of said flange and having its outer edge in registry with said groove.

2. A container for plants and their root balls comprising a side wall open at the top and bottom, said side wall having adjacent to but spaced upwardly from its lower edge an outwardly extending groove in its inner surface, the material of said side wall being continued from its lower edge and inwardly and upwardly, and having a centrally extending flange sloped downwardly and centrally and projecting from said upwardly extending portion and having a central opening therein, and a floor element resting on the uppermost part of said flange and having its outer edge in registry with said groove.

3. A container for plants and their root balls comprising a side wall open at the top and bottom, said side wall having adjacent to but spaced upwardly from its lower edge an outwardly extending groove in its inner surface, said side wall being provided with an addition extending from the lower edge of the side wall inwardly and upwardly, a centrally extending flange sloped downwardly and centrally and projecting from said upwardly extending portion and having a central opening therein, and a floor element having an upper surface higher at its center than at its outer edge, said floor element resting on the uppermost part of said flange and having its outer edge in registry with said groove.

4. A container for plants and their root balls comprising a side wall open at the top and bottom, said side wall having adjacent to but spaced upwardly from its lower edge an outwardly extending groove in its inner surface, said side wall being provided with an addition extending from the lower edge of the side wall inwardly and upwardly, a centrally extending flange sloped downwardly and centrally and projecting from said upwardly extending portion and having a central opening therein, and a floor element having an upper surface higher at its center than at its outer edge, said floor element resting on the uppermost part of said flange and having its outer edge in registry with said groove, said floor element having grooves in its upper surface to conduct water away from the plant in said container, said grooves including a first groove equally spaced from said side wall and having laterally extending grooves from said first groove.

5. A container for plants and their root balls comprising a side wall open at the top and bottom, said side wall having adjacent to but spaced upwardly from its lower edge an outwardly extending groove in its inner surface, said side wall being provided with an addition extending from the lower edge of the side wall inwardly and upwardly, a centrally extending flange sloped downwardly and centrally and projecting from said upwardly extending portion and having a central opening therein, and a removable floor element having an upper surface higher at its center than at its outer edge, said floor element resting on the uppermost part of said flange and having its outer edge in registry with said groove, said floor element being provided with a plurality of notches in its outer marginal edge and located above said flange whereby through said notches roots may project and the floor element may be removed with the root ball and without damage to the roots.

6. A container for plants and their root balls comprising a side wall open at the top and bottom, said side wall having adjacent to but spaced upwardly from its lower edge an outwardly extending groove in its inner surface, said side wall being provided with an addition extending from the lower edge of the side wall inwardly and upwardly, a centrally extending flange sloped downwardly and centrally and projecting from said upwardly extending portion and having a central opening therein, and a removable floor element having an upper surface higher at its center than at its outer edge, said floor element resting on the uppermost part of said flange and having its outer edge in registry with said groove, said floor element being provided with a plurality of notches in its outer marginal edge, and located above said flange whereby through said notches roots may project and the floor element may be removed with the root ball and without damage to the roots, and said laterally extending grooves leading to and terminating at the respective notches.

References Cited in the file of this patent

UNITED STATES PATENTS

| | | |
|---|---|---|
| 272,590 | Shepard | Feb. 20, 1883 |
| 319,057 | Bickley | June 2, 1885 |
| 357,698 | Burrough | Feb. 15, 1887 |
| 620,150 | Kitchen | Feb. 28, 1899 |
| 1,534,508 | Earp-Thomas | Apr. 21, 1925 |
| 1,868,609 | Lam | July 26, 1932 |
| 2,150,550 | Keller | Mar. 14, 1939 |
| 2,504,031 | Manning | Apr. 11, 1950 |

FOREIGN PATENTS

| | | |
|---|---|---|
| 160,979 | Switzerland | July 17, 1933 |